Patented Dec. 24, 1940

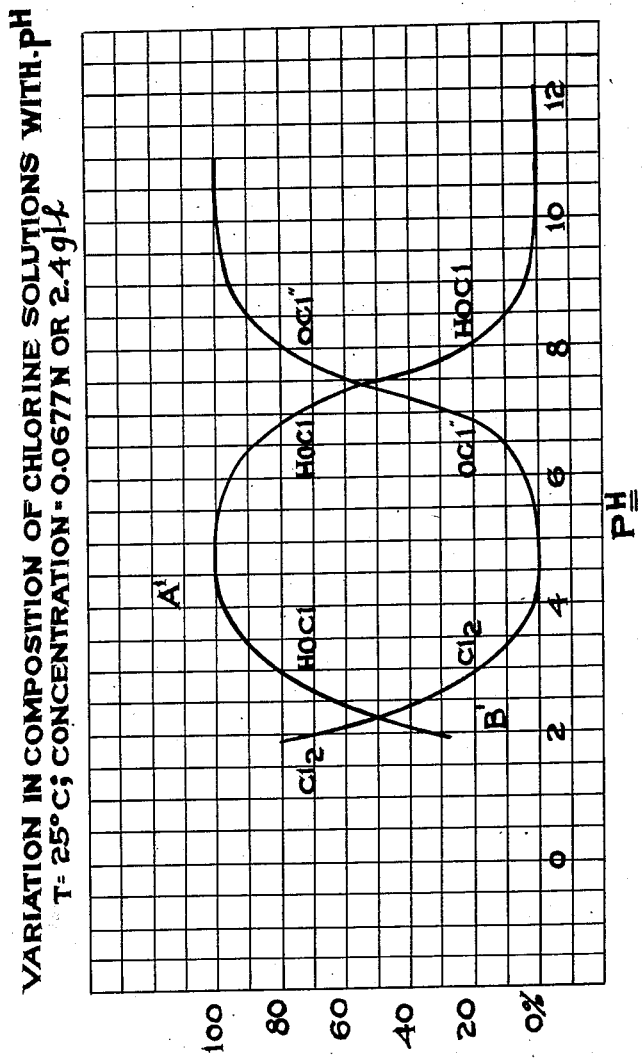

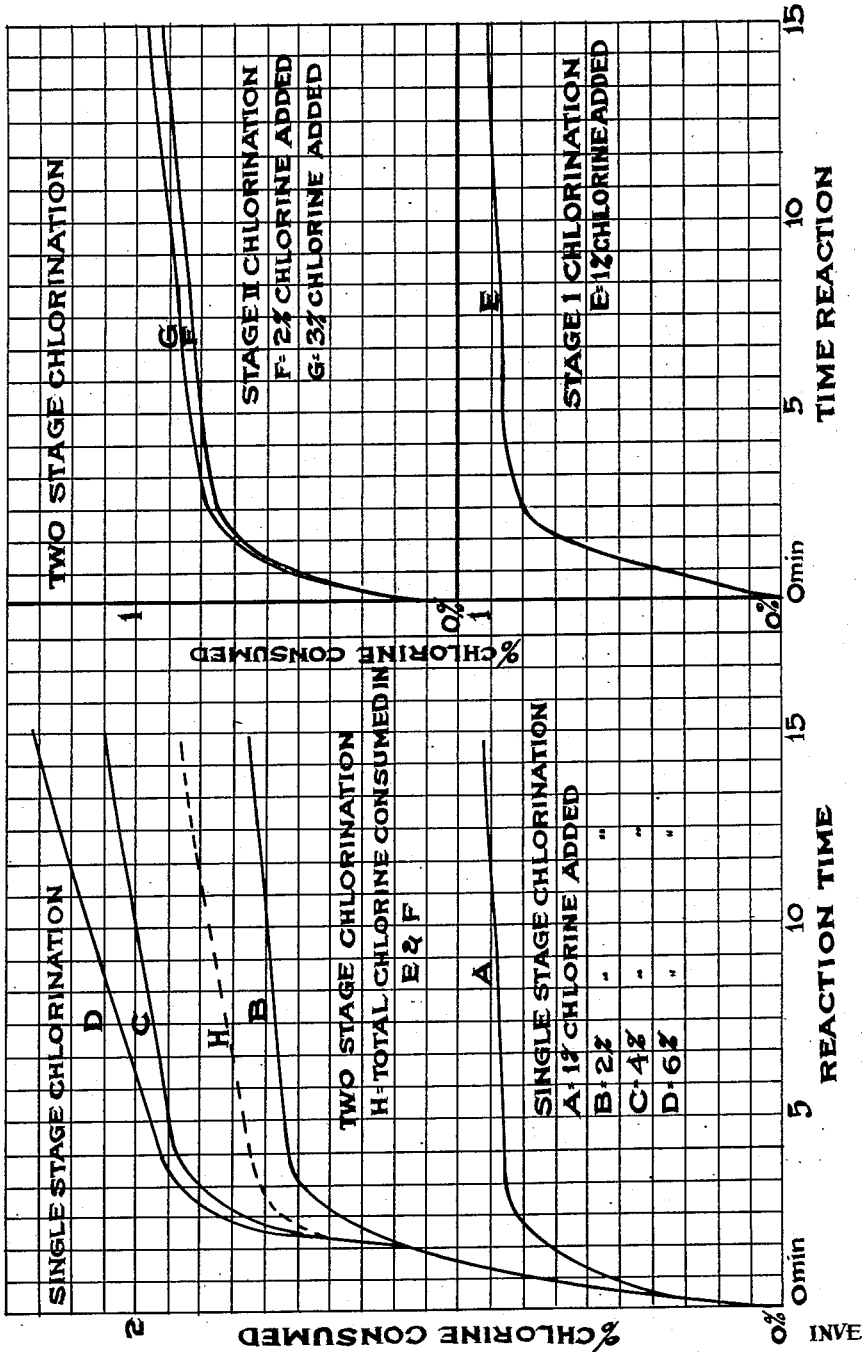

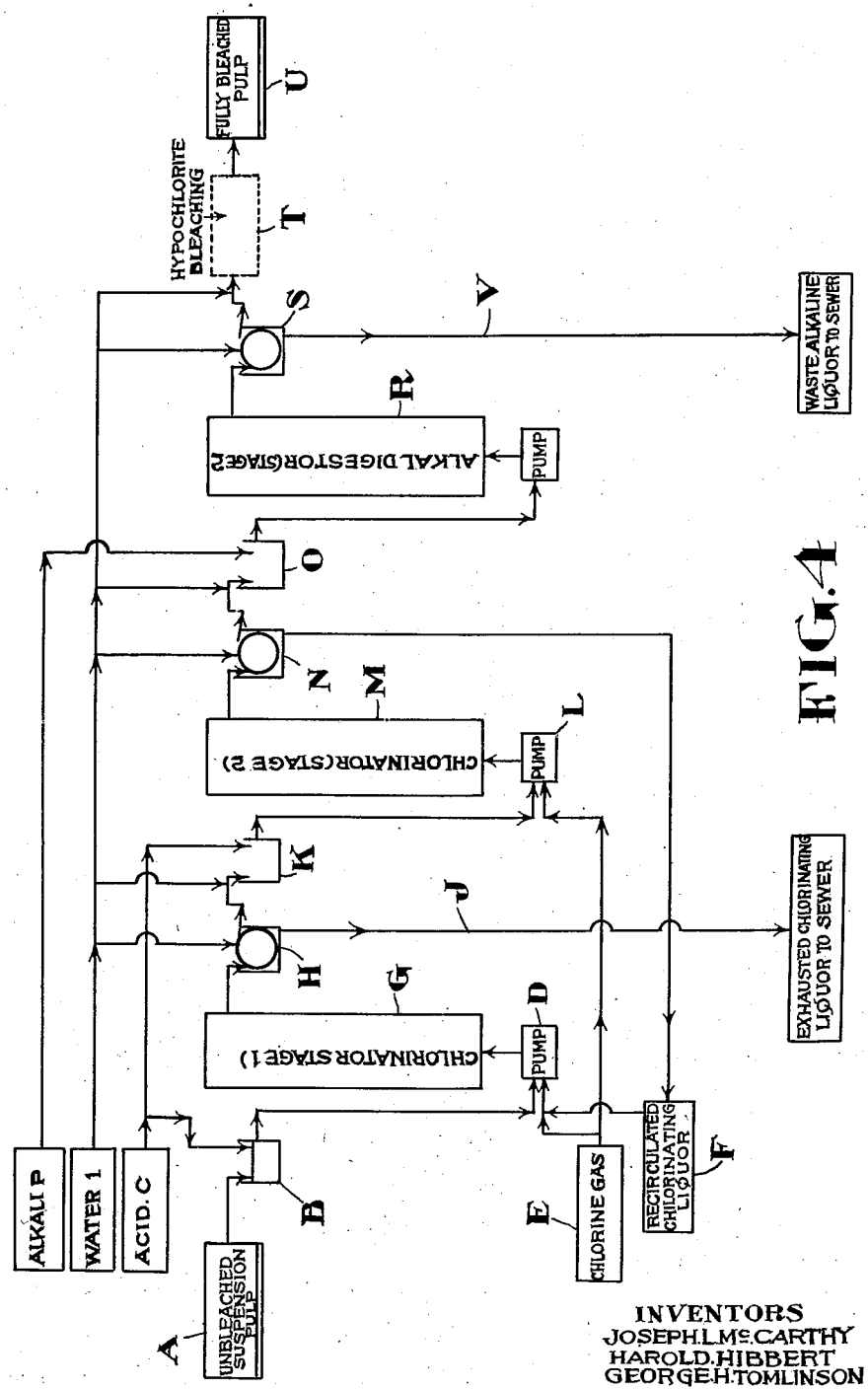

2,226,356

UNITED STATES PATENT OFFICE 2,226,356

PROCESS OF PURIFYING CELLULOSIC MATERIAL

Joseph L. McCarthy and Harold Hibbert, Montreal, Quebec, and George H. Tomlinson, Westmount, Quebec, Canada, assignors to Canada Paper Company, Montreal, Quebec, Canada Application March 9, 1939, Serial No. 260,808

10 Claims. (Cl. 8—108)

This invention relates to purification or bleaching of cellulosic fibrous materials by treatment with chlorine in aqueous solution; and it comprises a method of treatment which ensures substantially complete chlorination of the lignin, coloring matters, and other impurities present in the fibrous material with a smaller amount of chlorine and with less damage to the cellulosic constituents of the fibrous material than has heretofore been possible.

Aqueous solutions of chlorine have been used for many years in industrial bleaching operations, particularly in connection with the purification of cellulosic plant fibres and wood pulp. It is well known that incrustants, such as the lignin and/or the coloring matters present in these substances, react with chlorine to yield alkali soluble products which are easily removed by washing or digestion with alkaline solutions. On the other hand, removal of the lignin and/or coloring matters by reactions involving oxidation is difficult to accomplish without seriously damaging the cellulose. In the past various chlorinating bleaching processes have been devised with the obect of removing residual lignin and related compounds from cellulosic fibrous material without direct oxidation but these prior processes have failed to accomplish their intended result to a satisfactory degree due, apparently, to an inadequate realization of the factors involved in effecting substantially complete chlorination of the lignin under conditions inhibiting oxidation. In carrying out these prior processes chlorine or chlorine water has been added directly to the neutral or alkaline pulp suspension and the reaction permitted to proceed until all, or substantially all, the active chlorine has been consumed. Taking kraft pulp for an example, the usual alkalinity of the pulp suspension, prior to the addition of the active chlorine reagent, is of the order of pH 8 to pH 9, this depending largely upon the efficiency of the washing process after the pulping. When the chlorine gas or chlorine water is added to the pulp suspension the pH decreases and continues to decrease as the reaction proceeds.

Provided sufficient chlorine has been added, the acidity of the solution at the end of the reaction will be of the order of pH 2 to pH 4. This decrease in pH is apparently caused by the formation of HCl from the hydrolysis ensuing through dilution of the molecular chlorine added; from the decomposition of HOCl into HCl; and from substitution reactions with the plant incrustants, that is, reactions in which chlorine is substituted for hydrogen according to the following general equation:

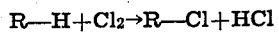

where R—H represents the chemical constituents comprising the plant incrustant.

Chlorine reacts with water and the HOCl formed ionizes as represented by the following equation which represents the equilibria present:

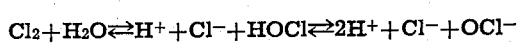

The addition of substances capable of forming $H^+$ and $Cl^-$ ions tends to shift the reaction to the left and thereby to increase the concentration of the HOCl as well as $Cl_2$, while the addition of substances forming $OH^-$ ions tends to shift the reaction to the right and to increase the concentration of HOCl and $OCl^-$.

We have discovered that if the pulp suspension is acidified to a pH value of the order of pH 1.5 to pH 3 before the active chlorine or chlorine solution is added, it is possible to effect substantially complete chlorination of the residual lignin and related compounds with an amount of chlorine which is from 20 to 50% less than the amount required in known bleaching processes, the exact saving realized in any given instance being largely dependent on the original pH of the pulp suspension and the amount of lignin contained in the pulp.

We consider that this saving in chlorine is probably due to the fact that the preliminary acidification of the pulp suspension increases, the concentration of the $Cl_2$ and correspondingly decreases the concentration of the HOCl which, in turn, greatly promotes desirable and efficient chlorination of the lignin and the coloring matter and hence their alkali-solubility, as opposed to undesirable and inefficient oxidation changes such as oxidation of the cellulose and incrustants as well as the formation of chlorates.

Proceeding now to a more detailed description, reference will be had to the drawings, wherein—

Figure 1 is a curve diagram which illustrates the changes in the concentrations of HOCl and $Cl_2$ which occur during the reaction period of the usual chlorinating process.

Figure 2 is a curve diagram which illustrates the amounts of chlorine consumed under various conditions in a series of single stage chlorination tests and in one case, the total amount consumed in a two stage chlorination reaction.

Figure 3 is a curve diagram which illustrates the improved results obtained with a two-stage chlorination process carried out in accordance with the present invention.

Fig. 4 is a flow sheet which illustrates one method of reducing the invention to practice.

Curves A' and B' of Fig. 1 show that, in the usual chlorinating process, there is a high concentration of HOCl throughout most of the reaction period, that is between pH 7 and pH 3, and that it is only in the latter phases of the reaction that the concentration of $Cl_2$ rises to an appreciable value, as shown by the left hand end of curve B'. Under these conditions maximum concentration of $Cl_2$ is preceded by oxidation and other wasteful reactions involving losses which, in addition to damaging the cellulose, tend to increase the amount of chlorine required to effect substantially complete saturation of the lignin and/or related compounds. On the other hand, when the chlorination is carried out in accordance with the present invention oxidation and other undesirable side reactions are obviated or minimized to such an extent as to enable substantially complete saturation of the lignin with a much smaller addition of chlorine than is now necessary.

According to one practical embodiment of this invention, the bleaching of a pulp suspension to a predetermined white color is accomplished by a series of treatments involving (1) adding an acid to the pulp suspension to adjust the pH to a value of the order of pH 1.5 to pH 3; (2) adding chlorine to the acidified suspension in sufficient amount to effect substantially complete chlorination of the lignin, coloring matters, etc., which are to be removed from the pulp; (3) separating the pulp from the liquor by filtration and washing the pulp with water; (4) subjecting the washed pulp to digestion and/or washing with alkaline liquor; (5) separating the pulp from the alkaline liquor and again washing it with water; (6) subjecting the pulp to a final bleaching treatment with an alkaline hypochlorite solution; and (7) separating the pulp from the alkaline hypochlorite solution and again washing it with water, the last treatment yielding a fully bleached product from which the lignin and related non-cellulosic compounds have been removed substantially without changing the cellulosic constituents and with a much smaller amount of chlorine as compared with prior processes.

The amount of chlorine used in step #2 must be considerably in excess of that which is consumed in the chlorination reaction in order that this reaction may proceed to substantial saturation of the lignin with chlorine and thus impart to the lignin practically complete alkali-solubility.

For example, when treating pulp acidified to a value of pH 2 we find that we can add chlorine in varying amounts up to a certain percentage by weight and that practically all of this chlorine will disappear almost immediately. If, however, we exceed this quantity of chlorine in treating the same pulp, we find that the chlorine consumed for the same period is increased but the chlorine is not exhausted. We have indicated this relationship in Fig. 2, the graphs of which are plotted from data obtained in a number of tests made with the same unbleached pulp, namely a typical grade of kraft pulp in aqueous suspension at 2% consistency and at an acidity of pH 2. The ordinates represent the amount of chlorine consumed in these tests while the abscissae represent the time in minutes. The results obtained by adding 1, 2, 4 and 6% of chlorine to the pulp in different tests are respectively indicated by curves A, B, C and D.

All of these curves show a rapid rise during the first few minutes and then more or less parallel each other in a flattened position thus suggesting that two types of reactions are involved. On comparing these curves it will be noted that the extent of the initial reaction represented by the sharply rising portion of each curve is related to the amount of chlorine present during this period and only tends towards completion when a relatively large excess of chlorine is employed. When a sufficient excess of chlorine is added to the pulp to carry this initial reaction to substantial completion, as indicated by curve C, the lignin becomes chlorinated to such a degree that its alkali-solubility is such as to permit the lignin to be almost quantitatively removed in alkaline solution. Normally, in carrying out the previously mentioned steps of our process, we therefore prefer to add, in step #2, an amount of chlorine approximately two to three times greater than the amount which the pulp can consume during the first five to ten minutes of the reaction.

In some cases where an excess of chlorine is used to carry the initial reaction to substantial completion it may be that the amount of active chlorine remaining in the solution at the conclusion of the reaction may not be of sufficient economic importance to justify its recovery. In such cases the liquor separated from the pulp in step #3 of our process may be discarded. In most cases, however, the amount of chlorine remaining in the solution after the chlorination process has proceeded to substantial completion is sufficient to justify recovery. Accordingly, an important feature of the present invention consists in effecting chlorination of the lignin by treating the pulp with chlorine in two stages so that the residual chlorine remaining in the treating solution at the conclusion of the second stage is reused in the initial stage so that the entire process is carried out with practically no loss of chlorine.

In the two-stage process contemplated by this invention, stage one is preferably commenced by adding an acid to the pulp to adjust the pH to a value of pH 1.5 to pH 3. Chlorine or chlorine water is then added in an amount insufficient to saturate the lignin. The pulp is then separated from the liquor and the latter discarded since the amount of unconsumed active chlorine contained therein is usually too small to warrant recovery. Stage #1 is then completed by washing the pulp with water to give a semi-chlorinated pulp. In stage two the semi-chlorinated pulp suspension is treated, if necessary, with enough acid to bring the suspension to pH 1.5 to pH 3 and then with approximately twice the amount of chlorine or chlorine water necessary to complete the substantial saturation of the lignin with chlorine. Following this the pulp, after being separated from the liquor by filtration, is digested and/or washed with an alkaline solution; is again filtered and washed with water; and is finally bleached to a permanent white color by subjecting it to a comparatively mild treatment with alkaline hypochlorite solution which serves to remove the residual coloring matter.

In the normal operation of this two-stage process, the active chlorine is applied to the semi-chlorinated pulp in stage two as described above and, after a suitable reaction time, the liquor which still contains the unused chlorine is filtered off and reused in the second step of stage one.

The chlorine treatment carried out in stage two may, whenever necessary or desirable, be preceded by an acidification step similar to the first step of stage one.

For convenient reference in subsequent discussion the various steps followed in the two-stage process are set down below in numerical order and in their proper sequence:

Stage 1

Step 1: Acidification of the pulp suspension.
Step 2: Addition and reaction of the active chlorine reagent recovered from step 7 of stage 2.
Step 3: Filtering and washing with water.

Stage 2

Step 4: Acidification of the pulp suspension.
Step 5: Addition of chlorine in excess of the amount consumed by the pulp in the reaction period provided.
Step 6: Filtering off the liquor at the end of the reaction period mentioned in step 5 and returning this liquor for use in step 2.
Step 7: Digestion and/or washing the pulp with alkaline solution.
Step 8: Filtering or washing with water.

Hypochlorite bleaching

Step 9: Hypochlorite treatment of the washed product obtained in step 8.

When treatment is carried out in accordance with this two-stage process we find that practically all of the added chlorine is consumed and that substantial saturation of the lignin with chlorine is obtained with a consumption of considerably less chlorine than is required in a single stage process, or even in two-stage chlorination processes carried out in accordance with prior practice. If, for example, we use 1% of chlorine in step two of stage one and follow this by treatment of the pulp with 2% or slightly more than 2% of chlorine in step 5 of stage 2, we obtain the same substantial saturation of the lignin with chlorine as is obtained when treating the same pulp in a single stage process using 4% of chlorine. Under our conditions of operation, we find that approximately 1% of chlorine is consumed in step 5 of stage 2, thus leaving 1% of unconsumed active chlorine which is available for recovery and reuse in step 2. This will be readily appreciable from comparison of the graph of Figs. 2 and 3. In these graphs the percentage of chlorine consumed under various conditions in treating the same pulp is plotted against the time of reaction.

As previously stated, the results obtained when using 1, 2, 4 and 6% of chlorine in different single stage bleaching tests are respectively indicated by curves A, B, C and D. As indicated by curve C the saturation of lignin with chlorine, as judged by the chlorine consumed after five minutes' reaction, amounts to approximately 1.9% of chlorine and requires an initial addition of 4% of chlorine to accomplish this result. The substantial saturation of the lignin with chlorine under these conditions is indicated by the fact that only slightly more chlorine is consumed in five minutes when the amount of chlorine added is increased to a value of 6% (curve D).

Fig. 3 illustrates graphically the results obtained when the same unbleached kraft pulp is subjected to two-stage chlorination in accordance with our invention. Curve E shows that with an initial addition of 1% of chlorine in step 2 of stage 1 practically all of the chlorine is consumed in the reaction time provided leaving very little excess to be discarded. Curve F shows that with a further addition of 2% of chlorine in step 5 of stage 2, substantially complete saturation of the lignin with chlorine is accomplished. In this connection attention is directed to curve G which shows that, with the addition of 3% of chlorine in step 5 of stage 2, there is only a very slight increase in the chlorine consumed as compared with that indicated by curve F. Curve F also shows that only about half of the chlorine added in stage 2 is consumed in effecting substantially complete chlorination of the lignin.

From this it will be seen that our two-stage process makes it possible to accomplish substantially complete chlorination of the lignin with a total addition of only 2% of chlorine as compared with the 4% of chlorine which, as shown by curve C in Fig. 2, must be added to accomplish the same result in a single stage process. This difference is due largely to the fact that, in our process, unused chlorine is recovered at the end of the reaction period provided for step 5 of stage 2 and is almost completely used up in step 2 of stage 1.

Our two-stage process also results in a further saving of chlorine which is best explained by comparing curves C and H of Fig. 2. Curve C shows that with the required initial addition of 4% of chlorine the amount of chlorine consumed in effecting substantially complete chlorination of the lignin in a single stage process is approximately 1.9%. Curve H corresponds to the summation of curve F and curve E of Fig. 3 and shows that only 1.7% is used up in our two-stage process in accomplishing the same result, namely, substantially complete saturation of the lignin with the chlorine. Apparently, this saving is due to the use in our two-stage process of solutions which are of lower chlorine concentration as compared with the normal single stage process. This use of solutions of lower chlorine concentration obviates or substantially minimizes loss of chlorine in side reactions and enables us to chlorinate the lignin not only completely but more economically.

Obviously the principles applied in our two-stage chlorination process are also applicable to processes in which the chlorination is accomplished in three or more stages. In this case the reaction liquor separated from the pulp at the conclusion of either the final or an intermediate chlorination stage may be reused in a preceding stage if it contains sufficient active chlorine to warrant its recovery. It is also pointed out that stage 2 of our two-stage process may be modified by the introduction of an additional treatment between steps 3 and 4, such additional treatment comprising a digestion and/or washing of the pulp with an alkaline solution followed by a filtering and washing of the pulp with water. We advise carrying out the chlorination stage or stages of our process at relatively low consistencies—as for example, less than 3% and in such a way as to ensure rapid mixing and at temperatures less than 85° F. Very good results are obtained when the pulp suspension is acidified to pH 2 or pH 3 before the chlorine is added. Under these conditions, and using a continuous process, only a short period, for example ten minutes or less, is required for the reaction of the chlorine to proceed to substantial completion.

It may also be noted that the process steps of our invention may be carried out successfully either in a batch or a continuous system with the aid of well known bleaching apparatus and equipment.

While our process is particularly advantageous for the bleaching of such fibrous materials as kraft pulp, it is not restricted to this application but may also be used for the bleaching of pulp produced by the sulphite, soda, alcoholic or other methods as well as for the bleaching of other plant materials such as ground-wood and various cellulosic fibres and grasses. In other words, we reserve the right to apply our invention to the bleaching of any cellulosic material for which our process is suitable, regardless of whether such material has or has not been previously subjected to chemical pulping or refining treatment.

The acidification step or steps of our process may be accomplished by adding any suitable acid to the pulp suspension. Hydrochloric acid may be cited as a highly suitable acid because of the "common ion" effect of the H+ and the Cl- ions in tending to shift the chlorine hydrolysis reaction toward the formation of increasing amounts of molecular chlorine. However, we find that sulphuric acid ($H_2SO_4$) is the most economical reagent for use in commercial practice.

Inorganic bases, such as sodium or calcium hydroxides, or organic bases, such as pyridine or ethanolamine, and organic solvents such as alcohols or dioxane, are suitable extractants for the chlorinated lignin. Hence, while we prefer to use sodium hydroxide in the commercial application of our process, we nevertheless reserve the right to employ any suitable organic or inorganic bases or any suitable organic or inorganic solvents for the removal of chlorinated lignins and to recover and use these chlorinated lignins and extracting solvents if so desired.

It will be apparent that some of the advantages inherent in our two-stage process will be realized even in the absence of the acidification step or steps preferably resorted to in order to suitably adjust the pH of the pulp suspension. However, when the two-stage recirculation process is carried out without such acidification of the pulp suspension the chlorine demand will necessarily be increased. By combining both principles the overall saving in chlorine as compared with other bleaching processes may exceed 50%.

It is thought that a more complete understanding of the invention described herein will be gained from the following description of Fig. 4 which shows the sequence of treatments and the progress of flow of the various materials.

An unbleached pulp suspension at pH 7 to pH 8 is passed from supply vessel A to tank B where it is mixed with acid from acid supply tank C and acidified to pH 1.5 to pH 3. The acidified material is mixed, in pump D, with fresh chlorine gas from container E or recirculated chlorinating liquor from container F and is passed to reaction tower G where the first stage chlorination is effected. From tower G the semi-chlorinated suspension is passed to filter H where the pulp is separated from the reaction liquor and is washed with water supplied from water tank I. The exhausted reaction liquor separated from the pulp by filter H is discharged to sewer through line J. The washed pulp is passed from filter H to acidification tank K where it is re-acidified with acid from acid supply tank C. The reacidified pulp is mixed with chlorine in pump L and passed to reaction tower M where the chlorination is completed. From tower M the suspension is passed to filter N where the pulp is separated from the reaction liquor, washed and then passed to mixing tank O where it is mixed with alkali drawn from supply tank P. From tank P the pulp is pumped to the alkali digestion tower R from whence it is subsequently passed through filter S, hypochlorite bleaching apparatus T, to storage U. The reaction liquor separated from the pulp at filter N is conducted to container F from whence it passes to pump D. The waste alkaline liquor separated from the pulp at filter S is discharged to waste through line V.

In normal operation all the chlorine used in the process is added to the pulp suspension during its passage from acid tank K to reaction tower M. It is only at the start that fresh chlorine is supplied to the pulp during its passage from acid tank B to tower G.

Having thus described our invention, what we claim is:

1. A process of purifying cellulosic material by treatment with chlorine in aqueous solution in which the chlorine treatment is preceded by acidification of the material to a pH value not greater than pH 3 by the addition of a non-oxidizing acid.

2. A process of purifying cellulosic material which comprises acidifying the material with sulphuric acid to a pH value not higher than pH 3 and then treating the acidified material with chlorine in aqueous solution, the amount of chlorine added being sufficient to ensure substantially complete chlorination of the lignin and related non-cellulosic compounds present in said material.

3. A process of purifying cellulosic material which comprises acidifying the material with hydrochloric acid to a pH value not higher than pH 3 and then treating the acidified material with sufficient chlorine in aqueous solution to ensure substantially complete chlorination of the lignin and related non-cellulosic compounds present in said material.

4. A process of purifying cellulosic material which comprises acidifying the material to a pH value not higher than pH 3 by the addition of a non-oxidizing mineral acid and then chlorinating the acidified material in two stages with intermediate washing in alkaline treatments.

5. A process of purifying cellulosic material which comprises the following steps: (1) adding a non-oxidizing acid to an aqueous suspension of said material to adjust the pH to a value not higher than pH 3; (2) adding chlorine to the acidified suspension in sufficient amount to effect substantially complete chlorination of lignin and related non-cellulosic compounds; (3) separating the pulp from the liquor by filtration; (4) washing the separated pulp with water; (5) treating the washed pulp with alkaline liquor; (6) separating the pulp from the alkaline liquor and again washing it with water; and (7) subjecting the pulp to a final bleaching treatment with an alkaline hypochlorite solution.

6. The process of claim 5 in which step 2 is carried out in two stages with intermediate filtering and washing operations, the amount of chlorine used in the first stage treatment being insufficient to effect substantially complete saturation of the lignin and related cellulosic compounds, the balance of the chlorine required to attain this result being added in the second stage.

7. A cyclic process of purifying cellulosic material comprising the following steps: (1) acidifying an aqueous suspension of said material to a pH value not greater than pH 3 by the addition of a non-oxidizing mineral acid; (2) adding to the acidified suspension an amount of chlorine which is insufficient to saturate the lignin and related non-cellulosic compounds; (3) separating the material from the reaction liquor of step 2 and washing it with water; (4) subjecting the washed and semi-chlorinated material to a further treatment with chlorine in which the amount of chlorine added is in excess of the amount required to saturate the lignin and related non-cellulosic compounds in a given reaction period; (5) separating the material from the liquor at the end of step 4 and reusing said liquor in step 2 for the chlorination of fresh material; (6) subjecting the twice chlorinated material to the action of alkaline solution; (7) separating said material from said alkaline solution and washing it with water and (8) subjecting said material to a final bleaching treatment with an alkaline hypochlorite solution.

8. The process of claim 7 in which an additional acidification treatment is introduced between steps 3 and 4, such additional treatment comprising a further addition of non-oxidizing mineral acid.

9. The process of claim 7 in which additional treatments are introduced between steps 3 and 4, such additional treatments comprising subjecting the pulp to the action of an alkaline solution followed by filtering and washing of the pulp with water.

10. A process of purifying cellulosic material which comprises adding sufficient sulphuric acid to an aqueous suspension of the material to give a pH value not higher than pH 3, adding sufficient chlorine to the acidified suspension to effect substantially complete chlorination of lignin and related non-cellulosic compounds present and then extracting the chlorinated reaction products by means of a suitable solvent.

JOSEPH L. McCARTHY.
HAROLD HIBBERT.
GEORGE H. TOMLINSON.